United States Patent [19]

O'Sullivan et al.

[11] 3,990,858
[45] Nov. 9, 1976

[54] DEVICE FOR RETAINING PARTICULATE MATERIAL IN UPFLOW TUBES

[75] Inventors: Thomas F. O'Sullivan, Wilton, Conn.; Paul Korwin, Flushing, N.Y.

[73] Assignee: The Lummus Company, Bloomfield, N.J.

[22] Filed: Nov. 19, 1974

[21] Appl. No.: 525,185

[52] U.S. Cl. .......................... 23/288 R; 23/288 M;
  55/387; 138/40; 138/42
[51] Int. Cl.² ...................... B01J 8/06; F15D 1/02;
  F15D 1/10
[58] Field of Search ............... 23/288 R, 288 M;
  55/387, 475; 210/282; 138/37, 40, 42, 39

[56] References Cited
UNITED STATES PATENTS

| 2,042,922 | 6/1936 | Beardsley | 23/288 M |
| 2,212,043 | 8/1940 | Pyzel | 55/387 X |
| 3,527,565 | 9/1970 | Banchik et al. | 23/288 M X |
| 3,560,167 | 2/1971 | Bruckner et al. | 23/288 R |
| 3,628,314 | 12/1971 | McCarthy et al. | 23/288 R X |
| 3,838,977 | 10/1974 | Warren | 23/288 R X |

Primary Examiner—Norman Yudkoff
Assistant Examiner—Barry I. Hollander
Attorney, Agent, or Firm—Marn & Jangarathis

[57] ABSTRACT

A weight is attached to a conically shaped hollow member which rests on the top of a bed of particulate material in a tube, with the weight functioning to prevent fluidization of the material in the tube. The conical member is provided with elongated slots whereby fluid exiting from the bed flows into the interior of the hollow member, through the slots and into the tube outlet.

10 Claims, 3 Drawing Figures

DEVICE FOR RETAINING PARTICULATE MATERIAL IN UPFLOW TUBES

The present invention relates to a device for retaining particulate matter in a tube, and more particularly, for retaining particulate matter in an upflow catalyst tube. Still more particularly, the present invention is related to a device for retaining catalyst in the tubes of an upflow reformer.

In many reactors in which a fluid flows through particulate material retained in a tube, a downflow operation is employed to prevent the movement or entrainment of solid particles in the fluid. In many cases, an upflow arrangement is preferred, but, to date, there has been no reliable means for preventing fluidization and entrainment of the solid material in the upflow fluid stream.

An object of the present invention is to provide a device for retaining particulate material in a tube.

Another object of the present invention is to provide a device for retaining and preventing fluidization of catalyst in a tubular reactor.

A further object of this invention is to provide for retention of catalyst in an upflow tubular reformer.

These and other objects of the present invention should be apparent from reading the following description thereof.

In accordance with the present invention, there is provided a device for retaining solid particulate material in a tube comprised of a weighted member positioned above and attached to a hollow member, defined by an upwardly converging conically shaped wall, (the term conical or conically generically includes frustrums of a cone), having a lower rim which is positioned on top of the particulate material. The conically shaped wall includes a plurality of openings whereby processing fluid flowing upwardly through the particulate material flows into the open interior of the hollow member and through the openings into the space between the conically shaped wall and inner tube wall. The weighted member includes portions which are spaced from the inner tube wall whereby the fluid flows upwardly between the weighted member and inner tube wall.

The weight of the weighted member is of a value sufficient to hold the particulate material in the tube. It has been found that the weight Q of the weighted member which is most effective has a value at least equal to:

$$Q = kg\, V^2 A\, L$$

wherein:
 $k$ = factor having numerical value 0.0035 sec²/in²
 $g$ = density of fluid at operating condition lbs/ft³
 $V$ = velocity of fluid at operating condition ft./Sec
 $A$ = inner cross sectional area of the catalyst tube in²
 $L$ = length of catalyst bed ft.

The openings in the conically shaped wall are preferably provided as elongated longitudinally extending slots which are spaced around the perimeter of the wall. The use of a conically shaped member provides an enlarged area for location of slots, thereby enlarging the free flow area and consequently reducing presssure drop. In addition, the conically shaped member retains the catalyst particles in place more effectively and provides an area for fluid flow free from wedged particles therefor, which reduces the possibility of plugging, whereby there is more constant fluid flow and more stable performance.

Although the hold-down device of the present invention may be employed in any tube in which a fluid flows upwardly through solid particles, the device is particularly suited for upflow catalytic reactions, and in particular, an upflow steam reformer. As a result of the use of the hold-down device in such tubular catalytic reactions, fluidization of the catalyst is prevented, thereby reducing catalyst attrition which results in reduction of pressure drop build-up, reduction of catalyst consumption and more stable catalyst bed levels.

The invention will be further described with respect to an embodiment thereof illustrated in the accompanying drawings wherein.

Although the invention is particularly described with respect to the preferred use in an upflow steam reformer, it is to be understood that the scope of the invention is not to be limited thereby.

Figure 1:
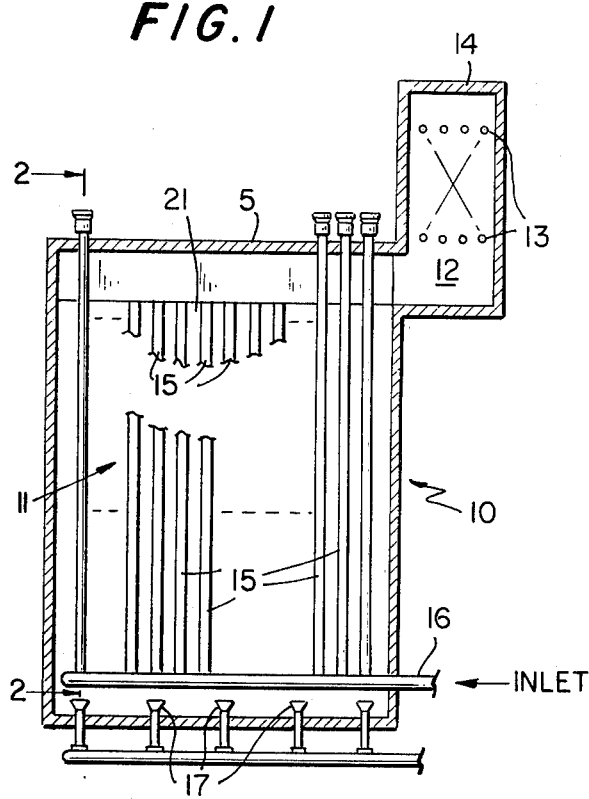
FIG. 1 is a simplified drawing of an upflow reformer including an embodiment of the device of the present invention.

Referring to FIG. 1 there is shown an upflow steam reformer 10, comprised of a radiant heating zone 11 and an offset convection heating zone 12, including a plurality of convection tubes 13, and a flue gas outlet 14.

The radiant zone 11 is provided with catalyst tubes 15, arranged in rows, with each row having the tube bottoms connected to an inlet header 16, and the tops thereof to an outlet header (not shown) to provide for once-through flow of processing fluid. Each row of tubes 15 is heated by floor burners 17 arranged in rows positioned on each side of a tube row and parallel thereto. The burners are positioned in a manner such that there is a row of burners on each side of a tube row. In some cases, the steam reformer can be provided with auxiliary wall burners.

In operation, a steam reforming feed is introduced into the tubes 15 through the inlet headers 16 and flow upwardly through the catalyst filled tubes 15 wherein the feed is heated to steam reforming conditions by the burners 17. In accordance with the furnace design, the flue gases flow co-currently to the steam reforming feed. The steam reforming effluent is withdrawn from the top of the tubes 15, and the upwardly flowing flue gas passes through the convection section 12, wherein the gases heat a fluid passing through the convection tubes 13, and out of the flue gas outlet 14.

In accordance with the present invention, the top portion of tubes 15 is free of catalyst and provided with a catalyst hold-down device to prevent fluidization of the catalyst in the tubes.

Figure 2:
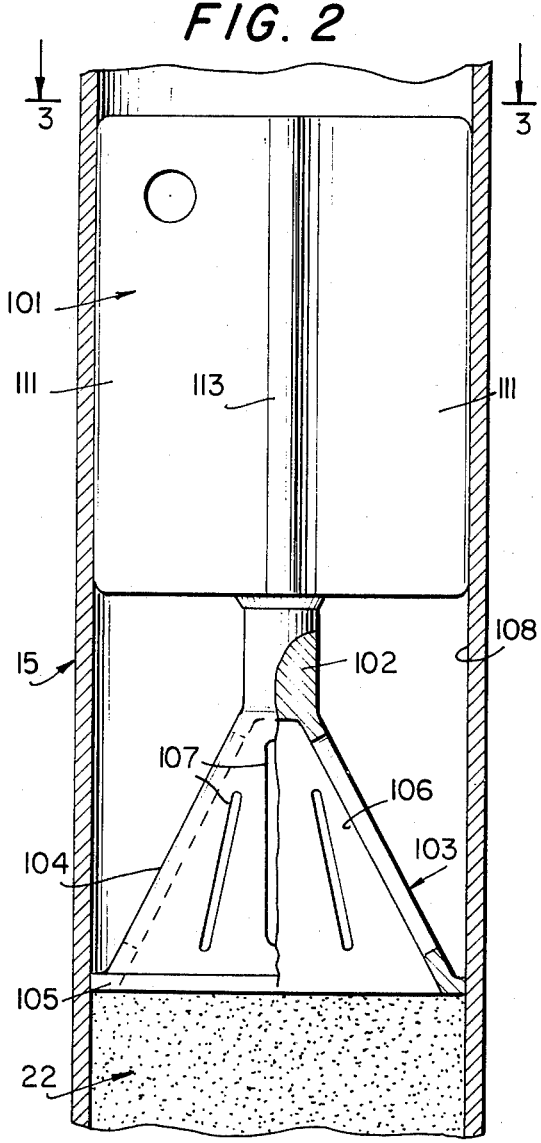
FIG. 2 is a cross sectional view of a reformer tube including an embodiment of the device of the present invention.
Figure 3:
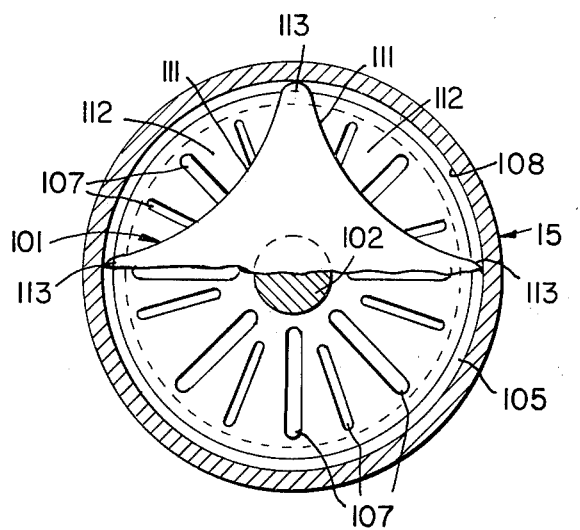
FIG. 3 is a sectional view taken on line 3—3 of FIG. 2.

Referring to FIG. 2, the top portion of the tubes 15, which is free of catalyst, is provided with a solid particle hold-down device comprised of a weighted member, in the form of an elongated plug 101, attached through a connecting member, in the form of a narrow rod 102, to a lower hollow member 103, defined by an upwardly converging conically shaped wall 104, having a narrow circular lower rim 105, which rests on the catalyst bed 22 in tube 15, whereby there is essentially no inhibition of fluid flow from the bed into the open interior 106 of the hollow member 103. Accordingly, the weight of plug 101 is applied to the catalyst bed 22 through the narrow rim 105 of the hollow member 103, thereby minimizing the inhibition of fluid flow through the particulate material. The axis of the conically shaped hollow member 103 is preferably in alignment with the axis of the tube 15 whereby the outside diameter of the conically shaped wall is about equal to the inside diameter of the tube 15; i.e., the rim 105 is in sliding engagement with the tube wall. The conically shaped wall 104 is provided with a plurality of openings, in the form of a plurality of elongated longitudinally extending slots 107, spaced around the perimeter of the wall 104, with the slots 107 preferably being sloped with respect to horizontal at the same angle as the wall 104. The length of each of the slots 107 can be identical to or may differ from each other. The slots 107 provide for fluid flow from the interior 106 of the hollow member 103 into the interior space 108 of the tube between the hollow member 103 and inner tube wall.

The plug 101 is shaped to provide portions thereof which are spaced from the tube wall whereby fluid can pass upwardly through the tube between the plug 101 and tube wall. As particularly shown, the plug 101 has a generally rhomboid shape, defined by four curved side walls 111, which are spaced from the interior of the tube 15 to provide open spaces which function as channels 112 for upward passage of the fluid between the plug 101 and inner tube wall. The walls 111 of the plug intersect at rounded corners 113, which are in sliding engagement with the tube wall, whereby the plug 101 can be inserted into the tube 15. The plug 101 functions as a guide to maintain the hollow member 103 axially oriented with tube 15 and to prevent any bending or bridging of the hollow member 103 as it aligns itself to the catalyst bed.

The weight of the plug 101 is selected to prevent fluidization of the particulate material, and as hereinabove noted, the weight of the plug preferably has a value calculated, as hereinabove described.

In operation, the steam reforming effluent exits from the top of the catalyst bed 22 into the open space 106 in the inerior of hollow member 103. The effluent passes through the slots 107 into the space 108 between the hollow member 103 and the inner surface of tube 15, and through the channels 112, defined between plug 101 and the tube 15 to the tube outlet. The weight of plug 101, applied to the catalyst bed through the lower rim 105 of the hollow member 103, prevents fluidization of the catalyst in the tubes.

In addition, as a result of the design of the hollow member 103, the effluent flows freely from the bed to the tube outlet.

As hereinabove noted, although the hold-down device of the present invention is particularly suited for an up-flow catalytic steam reformer, the device can be employed in other apparatus in which a fluid is to flow upwardly through a bed of solid particles to prevent fluidization of such particles. Generally, the device is suitable for catalytic operations other than steam reformers.

Numerous modifications and variations of the present invention are possible in light of the above teachings and, therefore, within the scope of the appended claims, the invention may be practiced otherwise than as particularly described.

What is claimed is:

1. In an upflow tube having solid particulate matter therein, the improvement comprising:

a hollow member including an upwardly converging conically shaped wall, said wall having a lower rim, said hollow member being positioned for free movement in said tube with only said lower rim resting on the top of particulate material in the tube, whereby the hollow member is in contact with the particulate matter through said lower rim and provides a free flow area within said hollow member, said conically shaped wall including a plurality of openings whereby fluid upwardly flowing through the particulate matter passes through the interior of said hollow member through said openings into a space defined between the interior surface of the tube and said conically shaped wall; and a weighted member connected to said hollow member, said weighted member being positioned in said tube above the hollow member, said weighted member including portions which are spaced from the interior of the tube wall whereby fluid can pass between the tube wall and said weighted member, said weighted member applying its weight to the particulate matter through the rim of the hollow member and having a weight sufficient to retain and prevent fluidization of the particulate matter in said tube and free flow area.

2. The device of claim 1 wherein said openings in the conically shaped wall are defined by a plurality of elongated longitudinally extending slots spaced around the perimeter of the wall.

3. The device of claim 2 wherein the outer diameter of the rim of the hollow member is about equal to the interior diameter of the tube.

4. The device of claim 3 wherein the weighted member includes portions which are in contact with the interior wall of the tube.

5. The device of claim 4 wherein the weight Q of the weighted member is at least equal to $Q = kg\ V^2\ A\ L$ wherein:

k = factor having numerical value $0.0035\ sec^2/in^2$
g = density of fluid at operating condition $lbs/ft^3$
V = velocity of fluid at operating condition ft./Sec
A = inner cross sectional area of the catalyst tube $in^2$
L = length of catalyst bed ft.

6. In an upflow tubular catalytic steam reformer, including at least one tube having catalyst therein, the improvement comprising:

a hollow member including an upwardly converging conically shaped wall, said wall having a lower rim, said hollow member being positioned for free movement in said at least one tube with only said lower rim resting on the top of catalyst in the tube, whereby the hollow member is in contact with the catalyst through said lower rim and provides a free flow area within said hollow member, said conically shaped wall including a plurality of openings whereby fluid upwardly flowing through the catalyst passes through the interior of said hollow member through said openings into a space defined between the interior surface of the tube and said conically shaped wall; and a weighted member connected to said hollow member, said weighted member being positioned in said at least one tube above the hollow member, said weighted member including portions which are spaced from the interior of the tube wall whereby fluid can pass between the tube wall and said weighted member, said weighted member applying its weight to the catalyst through the rim of the hollow member and having a weight sufficient to retain and prevent fluidization of the catalyst in said tube and free flow area.

7. The steam reformer of claim 6 wherein said openings in the conically shaped wall are defined by a plurality of elongated longitudinally extending slots spaced around the perimeter of the wall.

8. The steam reformer of claim 6 wherein the outer diameter of the rim of the hollow member is about equal to the interior diameter of the at least one tube.

9. The steam reformer of claim 6 wherein the weighted member includes portions which are in contact with the interior wall of the tube.

10. The steam reformer of claim 6 wherein the weight Q of the weighted member is at least equal to Q = $kg$ $V^2$ A L wherein:

$k$ = factor having numerical value 0.0035 sec$^2$/in$^2$
$g$ = density of fluid at operating condition lbs./ft$^3$
$V$ = velocity of fluid at operating condition ft/Sec.
$A$ = inner cross sectional area of the catalyst tube in$^2$
$L$ = length of catalyst bed ft.

\* \* \* \* \*